United States Patent

[11] 3,628,649

[72] Inventor Jacques Arvisenet
    Le Havre, France
[21] Appl. No. 886,452
[22] Filed Dec. 19, 1969
[45] Patented Dec. 21, 1971
[73] Assignee Sidel, Societe Anonyme
    Le Havre, France
[32] Priority Dec. 31, 1968
[33] France
[31] 182910

[54] APPARATUS FOR REGULARLY REGROUPING AND DISTRIBUTING OBJECTS FROM DIFFERENT ORIGINS ON A LEADOUT CONVEYOR
3 Claims, 5 Drawing Figs.

[52] U.S. Cl. .................................................. 198/32, 198/79
[51] Int. Cl. .................................................. B65g 47/26
[50] Field of Search ...................................... 198/32, 78, 79; 221/301; 193/40

[56] References Cited

UNITED STATES PATENTS

| | | | |
|---|---|---|---|
| 862,923 | 8/1907 | Linsley | 221/301 |
| 3,140,772 | 7/1964 | Seragnoli | 198/32 |
| 3,178,006 | 4/1965 | Nigrelli et al. | 198/32 |

FOREIGN PATENTS 767,498  9/1967  Canada ........................ 198/32

Primary Examiner—Harvey C. Hornsby
Assistant Examiner—Merle F. Maffei
Attorneys—Robert E. Burns and Emmanuel J. Lobato ABSTRACT: An apparatus for regularly regrouping and distributing objects from different origins on a leadout conveyor, these objects being fed by a plurality of feed conveyors extending at right angles to the leadout conveyor. The apparatus comprises, for each feed conveyor, a device for detecting the delivery of the objects onto said leadout conveyor, comprising essentially a lock-chamber disposed at the delivery end of the feed conveyor and equipped with means permitting the passage of only one object at a time towards the leadout conveyor, and an input pickup device adapted to be energized only by the permanent presence of an object on said feed conveyor at a point located upstream of said lock-chamber. The apparatus further includes an output pickup responsive to the passage of each object on said leadout conveyor, the various input pickups and the single output pickup being connected to an electric control device causing the simultaneous opening of the lock-chambers of said feed conveyors in which the permanent presence of objects has been detected by their energized input pickups at a rate of opening inversely proportional to the number of energized input pickups.

APPARATUS FOR REGULARLY REGROUPING AND DISTRIBUTING OBJECTS FROM DIFFERENT ORIGINS ON A LEADOUT CONVEYOR

BACKGROUND OF THE INVENTION

The present invention relates to an apparatus for regularly regrouping and distributing objects from different origins on a leadout or discharge conveyor.

In the handling of many kinds of articles, objects and goods, notably bottles and other containers for packaging a liquid or solid product, it is frequently necessary to regroup on a single conveyor objects delivered from different origins on feed conveyors disposed at right angles to the leadout or discharge conveyor. If it is desired to dispose these objects regularly on this last-named conveyor, a difficulty arises in case the rate at which these objects are transported on or in the various feed conveyors is irregular. Therefore, some output regulating means must be provided to permit a regular distribution of these objects on the leadout conveyor.

SUMMARY OF THE INVENTION

It is the essential object of the present invention to provide an apparatus for solving this problem in a simple and reliable manner while ensuring a regular distribution of the objects, irrespective of their random disposition on the leadout conveyor.

To this end, this apparatus for regularly regrouping and distributing objects from different origins on a leadout conveyor, these objects being fed by a plurality of feed conveyors extending at right angles to the leadout conveyor, is characterized in that it comprises for each feed conveyor, a device for detecting the delivery of these objects onto said leadout conveyor, this device comprising essentially a lock-chamber disposed at the delivery end of the feed conveyor and equipped with means permitting the passage of only one object at a time towards the leadout conveyor, and an input pickup device (hereinafter referred to as simply a pickup) adapted to be energized only by the permanent presence of an object on said feed conveyor a point located upstream of said lock-chamber. The apparatus further comprises an output pickup device responsive to the passage of each object on said leadout conveyor, the various input pickups and the single output pickup being connected to an electric control device causing the simultaneous opening of the lock-chambers of said feed conveyors in which the permanent presence of objects is detected by their energized input pickups, the rate of opening of said lock-chambers being inversely proportional to the number of energized input pickups.

In other words, assuming that the installation comprises $n$ feed conveyors and that a number $p$ of these conveyors carry upstream of their lock-chambers a number of waiting objects sufficient to cause their input pickups to detect the permanent presence of an object and be therefore energized, the electric control device which receives from the output pickup an impulse at each passage of an object on the leadout conveyor will cause the simultaneous opening of $p$ lock-chambers associated with the $p$ feed conveyors concerned only every $p$ impulses received from the output pickup. Thus, the electric control device will cause, each time $p$ objects have cleared the output pickup, the simultaneous opening of $p$ lock-chambers, whereby $p$ new objects will then be transferred to the leadout conveyor.

The electric control device of the apparatus of this invention comprises means permitting the rate of opening of the lock-chambers to the number of feed conveyors of which the input pickups have been energized. In other words, the rate of opening increases or decreases when the number of feed conveyors containing a sufficient number of waiting objects decreases or increases, respectively.

BRIEF DESCRIPTION OF THE DRAWING

A typical form of embodiment of the present invention will now be described by way of example with reference to the attached drawing, in which.

Figure 1:
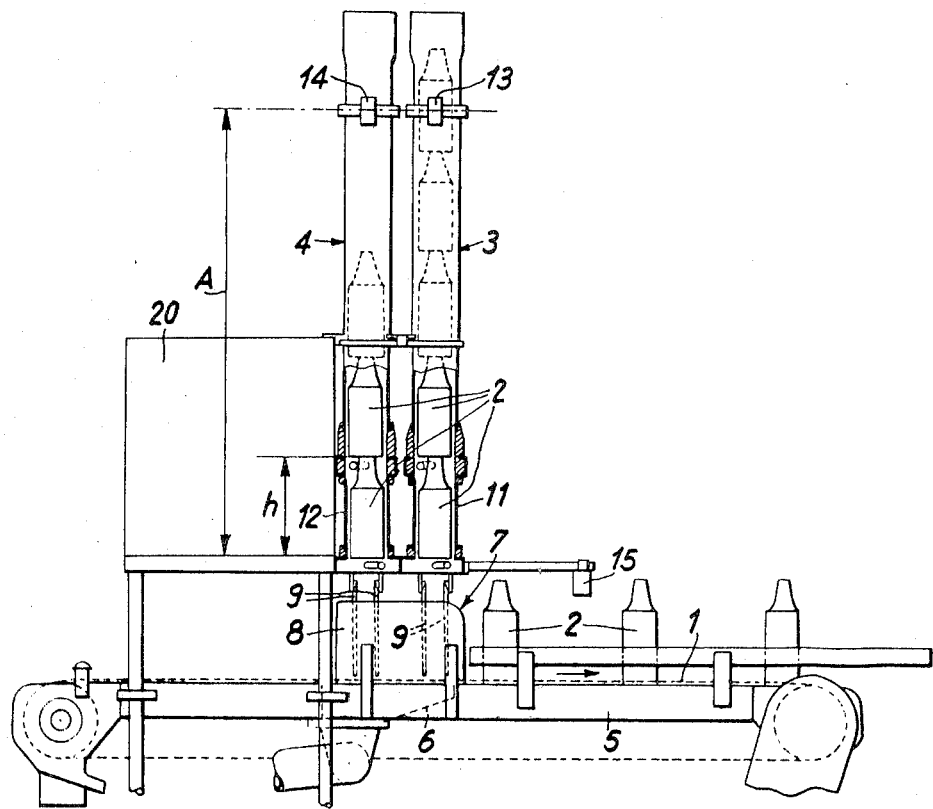
FIG. 1 is an elevational view of an apparatus for regularly regrouping and distributing objects dropped upon a conveyor, according to this invention.

5 is a wiring diagram of the electric control device of the apparatus.

DESCRIPTION OF THE PREFERRED EMBODIMENT

The apparatus illustrated in the drawing is designed for regrouping on a leadout conveyor 1 objects, in this case plastic bottles 2, delivered from a pair of feed conveyors 3 and 4 disposed at right angles to the leadout conveyor 1. In the specific form of embodiment illustrated in the attached drawing, the feed conveyors 3 and 4 consist of a pair of vertical ducts disposed side-by-side and in which the bottles 2 are allowed to drop freely.

The leadout conveyor 1 consists of an endless perforated belt of which the upper, operative reach travels to the right as seen in FIG. 1; this belt is driven on a frame structure 5 by a motor (not shown). A vacuum chamber 6 is mounted beneath the upper reach of the endless perforated belt conveyor 1 so as to constantly attract the bottles 1 against the belt surface as they are dropped thereupon.

The bottle receiving station designated generally by the reference numeral 7 comprises a pair of parallel lateral plates 8 and bottle guiding members 9 disposed beneath the outlet apertures of the vertical feed ducts 3 and 4.

At their lower ends these vertical ducts 3 and 4 open into corresponding lock-chambers 11 and 12 the function of which is to separately release the bottles and thus cause them to drop upon the horizontal conveyor 1. On the other hand, input pickups 13 and 14 consisting for example of photoelectric cells are mounted in the ducts 3 and 4 respectively for detecting the permanent presence of bottles in these ducts, as will be explained presently. The height of each lock-chamber 11, 12 corresponds to the height $h$ of a bottle 2 and the photocells 13 or 14 (or like detecting devices) are disposed upstream of these lock-chambers 11 and 12, at a level A in relation to the bottom of these lock-chambers, the height A corresponding to four or five times $h$. In other words, the light beams of these photocells 13 and 14 are blocked permanently only when four bottles are stacked above the lock-chambers in the corresponding vertical duct, as illustrated in FIG. 1 in the case of duct 3. On the other hand, in this example it is assumed that the vertical duct 4 contains (above its lock-chamber 12) only two bottles 2, so that another pair of bottles must fall into the duct 4 before the beam of photocell 14 is blocked permanently.

The passage of bottles carried by the conveyor belt 1 is detected by an output pickup 15 consisting for example of a photocell of which the distance in relation to vertical duct 3 is adjustable.

Figure 5:
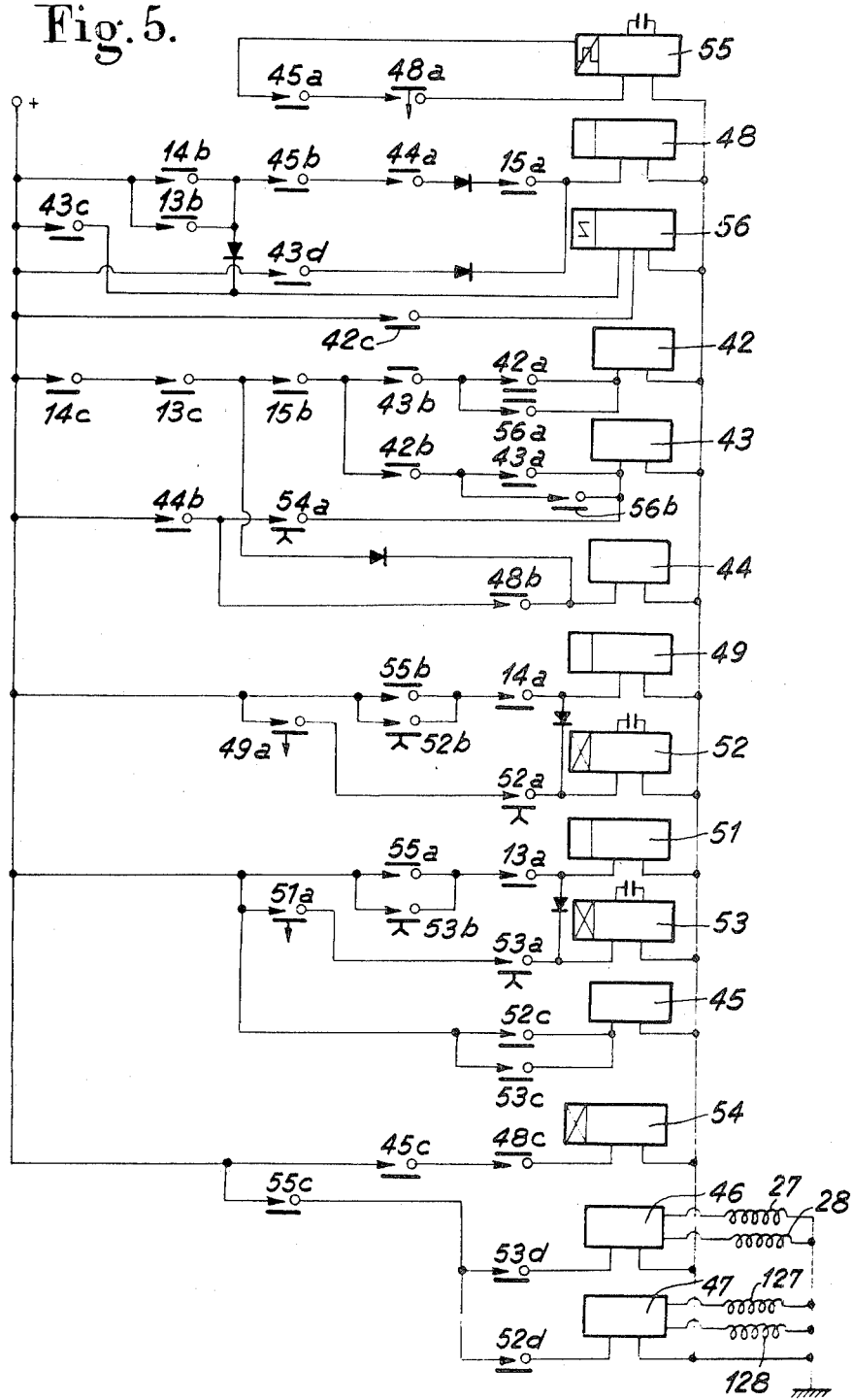

The above-described apparatus operates under the control of an electric device 20 to be described presently with reference to FIG. 5, the above-mentioned photocells 13, 14 being electrically connected to said control device 20.

Figure 2:
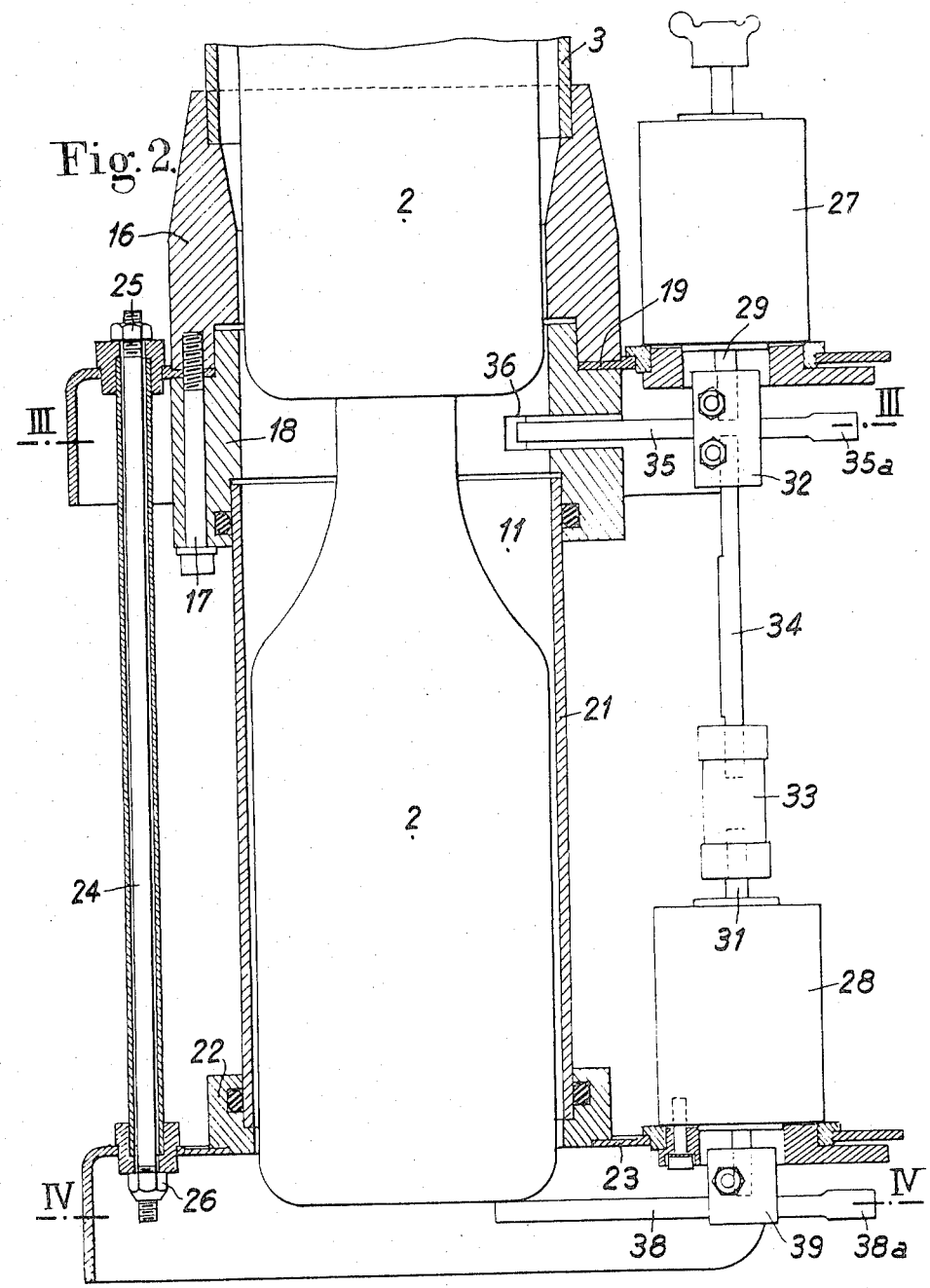
FIG. 2 is an axial section showing on a larger scale a lock-chamber provided at the lower end of a vertical object-feeding duct.
Figure 4:
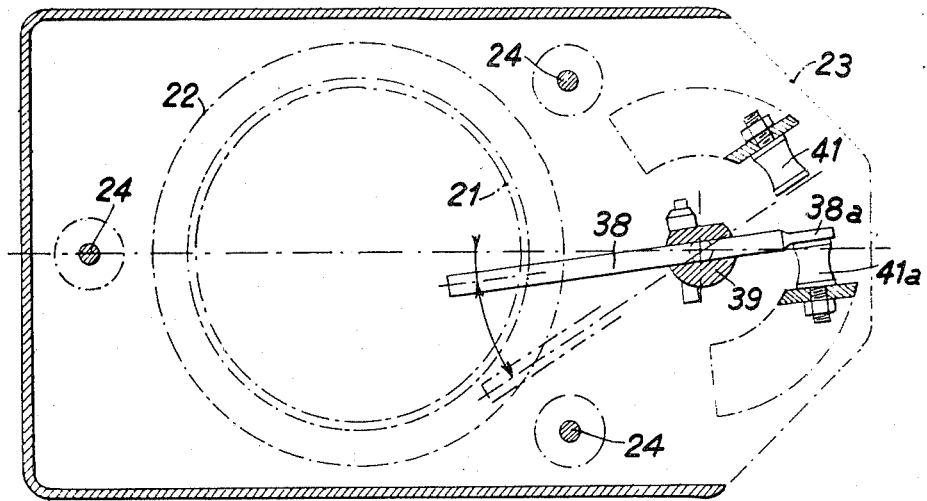
FIG. 4 is a horizontal section taken along the line IV—IV of FIG. 2.

Now reference will be made more particularly to FIGS. 2 and 4 of the drawing which show a typical form of embodiment of a lock-chamber 11 provided at the lower end of the vertical duct 3, the other lock-chamber 12 being constructed in the same manner. This lock-chamber 11 comprises at its upper portion a socket 16 in which the lower end of the tubular vertical duct 3 is fitted. An upper centering ring 18 is secured to the lower end of socket 16 by means of screws 17, a horizontal plate 19 being interposed between the socket 16 and ring 18. A transparent tube 21 is fitted in the upper center of the ring 18 and has its lower end fitted in a ring 22 carried in turn by a lower horizontal plate 23. The upper and lower plates 19 and 23 are assembled by means of three longitudinal tie rods 24 and by tightening nuts 25, 26 engaging the ends of these rods.

The plates 19 and 23 carry coaxial rotary electromagnets 27 and 28, respectively, having through core rods 29 and 31 mutually coupled by means of an intermediate rod 34.

The upper coupling sleeve 32 provided to this end is rigid with a diametral arm 35 engaging an arcuate slot 36 formed through the upper ring 18. This arm 35 is mounted to pivot between two end positions defined by stop members 37 and 37a engageable by the arm end 35a.

Figure 3:
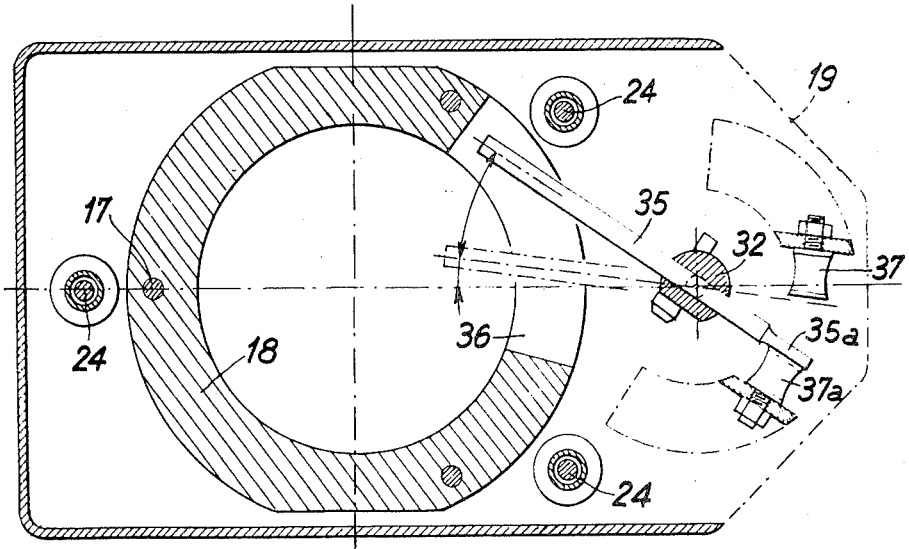
FIG. 3 is a horizontal section taken along the line III—III of FIG. 2.

In the inoperative position, i.e. when the upper electromagnet 27 is energized and the lower electromagnet is deenergized, the diametral arm 35 is retracted within the slot 36 in the position shown in thick lines in FIG. 3. On the other hand, the operative position (electromagnet 27 being deenergized and electromagnet 28 being energized) the arm 35 projects into the ring 18 and lies in the position shown in dash-and-dot lines in FIG. 3.

The lower end portion of rod 31 of electromagnet 28 carries a socket 39 rigid with another diametral arm 38 extending beneath the plate 23 and lower ring 22. This arm 38 can pivot between two end positions set by stop members 41 and 41a engaged by the end 38a of said arm 38. In the inoperative position (in which only electromagnet 27 is energized) the arm 38 is in the position shown in thick lines in FIG. 4 and lies in the path of the bottles 2 of which one is shown in thick lines in lock-chamber 11 in FIG. 2. Under these conditions, the arm 38 will prevent this bottle from being dropped onto the conveyor belt 1. On the other hand, when the electromagnet 28 is energized, the arm 38 is retracted laterally in an operative position shown in dash-and-dot lines and thus permits the fall of the bottle onto the conveyor belt 1.

According to a modified form of embodiment, both electromagnets 27 and 28 can be replaced by a single electromagnet, the arms 35 and 38 being returned to their inoperative positions by a spring.

Now the operation of the apparatus of this invention will be described with particular reference to the wiring diagram of the electric control device which is shown in FIG. 5. This device receives information signals from the pickups 13, 14 and 15, and controls the opening of lock-chambers 11 and 12 at a proper rate in order to ensure the regular distribution of bottles 2 to the leadout conveyor 1.

In FIG. 5 the various rectangles are the diagrammatic representation of the different relays incorporated in this control device and these relays actually consist of multicontact electronic switches. The following conventions are adopted in the diagram of FIG. 5: a back or normally closed contact is shown in the form of a bar overlying a pair of contact studs comprising a black arrowhead and a small circle, respectively. A front or normally open contact is shown in the form of a bar underlying the same type of contact studs. The diagram also comprises a plurality of instantaneous relays 42, 43, 44, 45, 46 and 47 (shown in the form of plain rectangles), a plurality of delayed-opening relays 48, 49 and 51, i.e. wherein the return to the inoperative position is delayed (these relays being represented by a rectangle having a smaller rectangle juxtaposed thereto), and also a plurality of delayed-closing relays 52, 53 and 54, i.e. relays wherein the return to the front position is retarded (each one of these last-named relays being shown in the form of a rectangle having a smaller rectangle juxtaposed thereto which has diagonal lines inscribed therein). The circuit further comprises a monostable relay 55 which becomes operative after a constant time period, and a bistable multivibrator 56 acting as a memory device.

The contacts of these various relays are designated by the same reference numerals as the relays, plus the indices a, b, etc... In the circuit diagram there are also shown contacts 13a, 13b, 13c controlled by the photocell 14 and the paid of contacts 15a and 15b controlled by the other photocell 15.

The windings of both electromagnets 27 and 28 associated with the lock-chamber 11 and duct 3 are connected to the two complementary output terminals of relay 46, so that when this relay is deenergized the electromagnet 27 along is energized and conversely, when the relay 46 is operative, only electromagnet 28 is energized. The diagram of FIG. 5 also shows two electromagnets 127 and 128 corresponding to electromagnets 27 and 28, respectively, and these electromagnets 127 and 128 are associated with the other lock-chamber 12 and the other duct 4, respectively. These electromagnets 127 and 128 are connected to two complementary output terminals of relay 47.

Now the operation of the apparatus of this invention will be described by considering for the time being only the duct 3 and the lock-chamber 11 disposed downstream thereof. It will be assumed that initially neither the duct 3 nor the lock-chamber 11 contain any bottles.

When a bottle 2 is dropped into the duct 3 it moves very rapidly past the photocell 13, thus causing the momentary closing of contact 13a connected to delay-action relays 51 and 53. Now this momentary closing has no influence whatsoever on the relay 53 which is of the delayed-closing type, since the time lag required before this relay becomes operative is greater than the closing time of contact 13a. Thus, the bottle drops into the lock-chamber 11 and is stopped therein by the arm 38. In fact, in this case the relay 46 is inoperative and electromagnet 27 is energized, thus causing the arm 38 to be interposed across the outlet of said lock-chamber 11.

As the few next bottles fall freely in the duct 3, they accumulate therein in stacked relationship but contact 13a closes only momentarily and no consequence is observed. It is only when the fifth bottle is superposed to the stack that the photocell 13 becomes positively operative. In fact, in this case a bottle 2 lies in the lock-chamber 11 and four other bottles are superposed thereto in duct 3. Therefore, the uppermost bottle of the stack will permanently block the light beam of photocell 13, thus causing the permanent closing of contact 13a. The closing of this contact is attended by the instantaneous energization of delay-action relay 51 (which opens with a certain time lag) and, after a certain time period, by the energization of delay-action relay 53 (which closes with a certain time lag). This relay 53 is then self-energized via front contacts 51a and 53a, then closed. Relay 51 opens with a certain time lay to prevent contact 51a from opening untimely during the temporary blocking due to the fall of a bottle.

As can be seen in FIG. 5, contact 13a is connected in series with a pair of parallel-connected contacts, i.e. a back contact 55a of monostable relay 55 and a front contact 53b of relay 53. As will be explained presently, back contact 55a remains open as long as lock-chamber 11 is open. In other words, when a bottle falling in the duct 3 causes permanent blocking of the light beam of photocell 13, another bottle is being extracted from said lock-chamber 11 and falls upon the leadout conveyor 1, the opening of contact 55a preventing the energization of relays 51 and 53 as long as relay 55 has not been deenergized.

The function of front contact 53b connected in parallel to contact 53a is to prevent relay 53 from being deenergized each time contact 55a is opened during the normal operation of the apparatus.

Now the manner in which a bottle enclosed in lock-chamber 11 is extracted therefrom when a bottle constantly blocks the beam of photocell 13 will be described. When the delay-action relay 53 is in its operative position as explained in the foregoing, the closing of front contact 53c thereof will move relay 45 to its operative position. The passage to operative position of this relay is also controlled by a front contact 52c of relay 52. Both relays 49 and 52 are connected to contact 14a of photocell 14 associated with the other duct 4 and operate like the relevant relays 51 and 53 mentioned hereinabove. Contacts 49a, 55b, 52b and 52a are connected in the same manner and perform the same functions as the corresponding contacts 51a, 55a, 53b and 53a.

Under these conditions, when the beams of photocells 13 and/or 14 is or are blocked permanently, relay 45 is moved to its operative position. This closes the front contact 45a connected to relay 55 operating as a time lag monostable relay. This relay 55 remains operative during a constant time period (for instance 0.8 second) corresponding to the opening time of each lock-chamber 11 and 12. The passage of relay 55 to its operative position is attended not only by the opening of contacts 55a and 55b, but also by the closing of front contact 55c connected in series with relays 46 and 47 via front contacts 53d and 52d, respectively. Therefore, the closing of contact 55c caused the energization of relay 46 and/or relay 47 according to whether contact 53d and/or contact 52d is closed. Assuming that contact 53d is closed (with cell 13 blocked permanently) the energization of relay 46 causes the energization of electromagnet 28 and the deenergization of electromagnet 27. As a consequence, both arms 35 and 38 are rotated counterclockwise as seen in FIGS. 3 and 4. The lower arm 38 releases the bottle contained in lock-chamber 11 and this bottle can thus fall freely upon the leadout conveyor 1. On the other hand, the upper arm 35 projects into the lock-chamber 11 under the bottom of the next bottle, thus retaining this bottle as well as the other bottles of the stack. At the end of a time period of 0.8 second, corresponding to the time during which the lock-chamber 11 was open, relay 35 is deenergized, contact 55c opens and relay 46 is also deenergized. Electromagnet 27 is then energized while electromagnet 28 is deenergized. This is attended by a pivotal movement of arms 37 and 38 in the clockwise direction, whereby the upper arm 35 is retracted within the slot 36 and releases the next bottle which falls freely into the underlying lock-chamber 11 in which it is retained by the lower arm 38.

Now the same operation takes place in parallel in the other lock-chamber 12 if contact 52c is closed (the beam of cell 14 being also permanently blocked by a bottle).

The bottle having fallen upon the continuously operating leadout conveyor 1 is carried along by this conveyor and thus caused to move past a photocell 15. Then, two cases may arise, according to whether one or both photocells 13 and 14 are blocked permanently.

Assuming firstly that only one cell is blocked permanently, say, cell 13, this means that the duct 3 contains at least four bottles above the lock-chamber 11.

The circuit comprises a logic OR gate consisting of a pair of back contacts 13b and 14b connected in parallel. These contacts are connected in series with a front contact 45b, a back contact 44a, the front contact 15a responsive to photocell 15 and the delayed-opening relay 48. Contact 44a is closed for, as will be seen presently, relay 44 is operative only when both photocells 13 and 14 have their light beams blocked simultaneously. Therefore, when the photocell 15 detects the passage of a bottle, it closes its contact 15a, thus causing the instantaneous energization of the delayed-opening relay 48. The passage of this relay 48 to its operative condition causes the opening of its back contact 48a in series with relay 55, thus deenergizing the winding of this relay 55. When the bottle has cleared the beam of photocell 15, contact 15a opens and relay 48 resumes its inoperative or deenergized condition with a certain time lag. As a result, contact 48a is closed, thus causing relay 55 to be reenergized during a time period of 0.8 second. The lock-chamber 11 will then open and release the bottle contained therein which falls upon the underlying leadout conveyor 1.

The above-described operation is repeated each time a bottle moves past photocell 15.

Now the case in which the beam of photocell 14 associated with the other duct 4 is blocked permanently will be examined in more detail, i.e. with both ducts 3 and 4 filled with bottles. In this case the opening rate of lock-chambers 11 and 12 (which open in parallel so as to drop two bottles upon the leadout conveyor each time they are opened) must be divided by two.

In case both beams of cells 13 and 14 are blocked simultaneously, both contacts 13b and 14b will be opened and therefore contact 15a is no longer operative since the corresponding energizing circuit of relay 48 is open. On the other hand, both series connected front contacts 13c and 14c are closed. These contacts constitute an AND gate and are connected in series with another front contact 15b of photocell 15. This contact 15b is connected on the one hand to relay 42 via a back contact 43b in series with front contact 42a and back contact 56a connected in parallel, and on the other hand to relay 43 via back contact 42b in series with front contacts 43a and 56b connected in parallel. Besides, contacts 14 and 13c are connected in series to relay 44. Since these last-named contacts are closed, relay 44 is energized. As a result, the safety contact 44a in series with relay 48 is opened and prevents the energization of this relay through the corresponding circuit. On the other hand, relay 44 is self-energized via its front contact 44b and back contact 48b.

One input of the bistable multivibrator 56 is connected to the front contact 43c and to the OR gate comprised of the pair of parallel-connected contacts 13b and 14b. Consequently, as long as either of these contacts is closed, the bistable multivibrator 56 is in a first inoperative stable condition. The other input of multivibrator 56 which controls the passage of this multivibrator to its other stable or operative condition is connected to front contact 42c.

When a bottle blocks the light beam of cell 15, contact 15b is closed and as a result, the relay 42 is energized due to the closing of contacts 43b and 56a, the latter being closed when the monostable multivibrator 56 is on its inoperative condition. The energization of relay 42 is attended by the closing of front contact 42c connected to the other input of bistable multivibrator 56. The losing of this contact will thus cause the switching of this multivibrator to its operative condition. Thus, contact 56a is open and contact 56b is closed.

Under these conditions, when the next bottle moves past the cell 15, the closing of contact 55b will cause the energization of relay 43 via closed contacts 42b and 56b. The momentary closing of contact 43d causes the relay 48 to become inoperative and therefore relay 55 to become operative during a 0.8-second time period, during which both lock-chambers 11 and 12 are open, thus allowing a pair of bottles to fall simultaneously upon the leadout conveyor 1.

At the same time, the temporary closing of contact 43c causes the switching of the monostable multivibrator 56 to its inoperative condition.

Now the operation of the apparatus according to this invention will be described with specific reference to the case wherein, as a consequence of a lack of supply of bottles to one of the feed ducts, one of the photocells 13, 14 not blocked permanently. In other words, the operation must change from one type of operation, wherein the rate is divided by two, to another type of operation, wherein a single duct is operative, i.e. at a normal rate. Relay 54 is provided for this purpose. When either of cells 13 or 14 is not blocked permanently by a bottle, one of contacts 13c or 14c is open, thus preventing the subsequent energization of relay 44. On the other hand, the passage of relay 48 to its operative condition cannot be controlled by contact 15a since contact 44a is open, relay 44 being held in its operative position. Relay 54 is connected in series to a front contact 45c and a back contact 48c. Relay 54 is of the delayed-closing type and the corresponding time lag is greater than the output rate, whereby the opening and closing of contact 48cannot exert any influence on relay 54, which remains inoperative.

When switching from the operation with both ducts 3 and 4 in parallel to the single-duct operation, contact 48c is reclosed and after a time period corresponding to the preset time lag, relay 54 is moved to its operative position. Contact 54a is closed and relay 43 is energized, thus closing contact 43d and causing the energization of relay 48, as already explained in the foregoing.

From this moment on, normal operation with a single duct is resumed.

Although the above description refers more particularly to an apparatus comprising two parallel vertical ducts 3 and 4 in which the objects can fall freely, it is clear that the present invention is applicable as well to any other type of feed conveyor whether of the free-fall type (for example a canted duct) or wherein the motion is produced by a movable member (such as a horizontal conveyor of the belt, perforated-belt, chain-type, etc..).

Besides, the apparatus according to this invention is also adapted to be associated, at the expenses of a slightly more elaborate electric control circuitry, to a number of feed conveyors greater than two. In the general case of $n$ conveyors, the electrical control device must comprise logic circuits capable of controlling (in case $p$ conveyors contain a sufficient number of waiting objects and can thus feed the leadout conveyors) the simultaneous opening of $p$ lock-chambers associated with these conveyors, at a rate corresponding to $1p$ times the normal rate in case a single feed conveyor were operative.

What I claim is:

1. An apparatus for regularly regrouping and distributing, on a leadout conveyor, objects from different origins and which are supplied by a plurality of feed conveyors extending at right angles to said leadout conveyor comprising: for each feed conveyor, a device for controlling the arrival of objects on said leadout conveyor, said device comprising means defining a lock-chamber disposed at the outlet end of said feed conveyor, means in said lock-chamber for allowing only one object at a time to pass to said leadout conveyor comprising two horizontal upper and lower stop arms, a pivotally mounted vertical rod rigid with said stop arms, and a device for controlling the pivotal movements of said rod between two end positions in which only one of said stop arms is interposed in the vertical path of said objects, that is, the upper arm being retracted when the lower arm is interposed in the path of said objects, and vice versa, said last-mentioned device including first and second rotary coaxial electromagnets having their core rods rigidly coupled to each other, and means for alternately energizing said first and second electromagnets, and an input pickup device energizable in response to detection of the permanent presence of an object being supplied by said feed conveyor at a point located upstream of said lock-chamber; an output pickup device operative to detect the passage of each object on said leadout conveyor, and electric control means having connected thereto the different input pickup devices associated with each feed conveyor and the single output pickup device and being operative to effect the simultaneous opening of the lock-chambers of said feed conveyors in which the permanent presence of objects has been detected by respective ones of the energized input pickup devices at a rate inversely proportional to the number of energized input pickup devices.

2. An apparatus as set forth in claim 1, wherein said feed conveyors comprise first and second vertical ducts disposed in side-by-side relationship through which the objects to be distributed may fall freely and with which first and second input pickup devices are associated respectively.

3. An apparatus as set forth in claim 2, wherein said electric control means comprise first, second and third contacts of said first input pickup device associated with said first vertical duct, first, second and third contacts of said second input pickup device associated with said second vertical duct, first and second contacts of said output pickup device, first, second, third, fourth, fifth, sixth, seventh, eighth, ninth, 10th, 11th, 12th, 13th, and 14th relays comprising normally closed back contacts and/or normally open front contacts, said first relay comprising two complementary output terminals having connected thereto the first and second electromagnets controlling the lock-chamber of the first vertical duct, respectively, said second relay having two complementary output terminals connected to said first and second electromagnets controlling the lock-chamber of said second vertical duct, respectively, said first and second relays being connected in series respectively with first front contacts of said third and fourth relays, which contacts are also connected in common to a first front contact of said fifth relay constituting a monostable relay controlling the opening of said lock-chambers, said third relay being of the delayed-closing type and connected to a circuit comprising two parallel branches, the first branch of this circuit comprising the first front contact of said first pickup device and a parallel circuit comprising a second back contact of said fifth relay and a second front contact of said third relay, the second branch of said two-branch circuit comprising a third front contact of said third relay and a first front contact of said sixth relay which is a delayed opening relay connected in parallel to said third relay, said fourth relay being of the delayed-closing type and connected to a circuit comprising two parallel branches comprising in turn, in a first branch, the first front contact of said second input pickup device and a parallel circuit comprising a third back contact of said fifth relay and a second front contact of said fourth relay, and in another branch a third front contact of said fourth relay and a first front contact of said seventh relay which is of the delayed-opening type and connected in parallel to said fourth relay, said eighth relay being connected in parallel to fourth front contacts of said third and fourth relays respectively, said ninth relay, which is of the delayed-opening type, being connected in series with said first front contact of said output pickup device, a first back contact of said 10th relay, a first front contact of said eighth relay and an OR circuit consisting of the two second back contacts connected in parallel, of said first and second input pickup devices respectively, said fifth monostable relay controlling the opening of said lock-chambers being connected in series with a second front contact of said eighth relay and a first back contact of said ninth relay, said electric control device further comprising an AND circuit consisting of the two series connected third front contacts of said first and second input pickup devices, said AND circuit being connected in turn on the one hand to said 10th relay also connected in series with a second back contact of said ninth relay and a second front contact of said 10th relay, and on the other hand to the second front contact of said output pickup device which is connected in turn to two parallel circuits containing therein said 11th and 12th relays respectively, the first one of said last-named parallel circuits comprising said 11th relay and, in series therewith, a first back contact of said 12th relay constituting a bistable multivibrator, the other parallel circuit comprising said 12th relay and, in series with this 12th relay, a second back contact of said 11th relay and two parallel contacts, namely a second front contact of said 12th relay and a second front contact of said 13th relay constituting a bistable multivibrator, a third front contact of said 12th relay and said OR circuit being connected in parallel to a first control input of said 13th relay constituting a bistable multivibrator, the other input of said 13th relay being connected in series to a third front contact of said 11th relay, a fourth front contact of said 12th relay being connected to said ninth relay, and finally said 14th relay, which is of the delayed-closing type, connected in series with a third front contact of said eighth relay and a third back contact of said ninth relay, a front contact of said 14th relay being connected between said 12th relay and the second front contact of said 10th relay.

* * * * *